United States Patent [19]
Kato

[11] Patent Number: 5,905,501
[45] Date of Patent: May 18, 1999

[54] METHOD OF AND APPARATUS FOR GENERATING ASSEMBLY VIEW

[75] Inventor: Akira Kato, Kawasaki, Japan

[73] Assignee: Fujitsu Limited, Kawasaki, Japan

[21] Appl. No.: 08/859,252

[22] Filed: May 20, 1997

Related U.S. Application Data

[63] Continuation of application No. 08/254,891, Jun. 6, 1994, abandoned.

[30] Foreign Application Priority Data

Aug. 18, 1993 [JP] Japan .................................. 5-204011

[51] Int. Cl.$^6$ .................................................. G06T 15/00
[52] U.S. Cl. ...................... 345/420; 364/474.24; 345/419
[58] Field of Search ................................ 345/419.2, 501, 345/433.8; 364/468.01, 468.02, 468.03, 468.04, 474.22, 474.24, 578

[56] References Cited

U.S. PATENT DOCUMENTS

| | | | |
|---|---|---|---|
| 5,442,563 | 8/1995 | Lee ......................................... | 364/468 |
| 5,485,560 | 1/1996 | Ishida et al. ............................ | 395/133 |
| 5,619,630 | 4/1997 | Minami et al. ......................... | 345/433 |

OTHER PUBLICATIONS

Mohammad, et al, "Automatic Generation of Exploded Views by Graph Transformation", IEEE, Artificail Intelligence Applications. Jun. 1993, pp. 368–374.

Primary Examiner—Rudolph J. Buchel, Jr.
Attorney, Agent, or Firm—Staas & Halsey

[57] ABSTRACT

A method of and an apparatus for generating an assembly view from design drawing data by a CAD system are provided which can generate an assembly view of a three-dimensional body viewed from an arbitrary direction in a short time at a low cost with a pinpoint accuracy, the three-dimensional body being particularly composed of a plurality of parts representing a product. First, the three-dimensional product is displayed to a three-dimensional coordinate system set on a two-dimensional plane. Next, a direction of point of view from which the product of the three-dimensional body is desired to be viewed as an assembly view is entered by a value of a degree of axis rotation, and then parts desired to be disassembled and removed from the plurality of the parts constituting the product are instructed and moving directions and moving distances of the parts are entered with respect to all the parts desired to be disassembled and moved. Then, the three-dimensional body is disassembled by moving all the parts instructed to be disassembled in the instructed moving directions by the entered moving distances. The disassembled three-dimensional body is projected onto a two dimensional plane from the previously entered direction of point of view to thereby generate a figure of the three-dimensional body on the two-dimensional plane. Finally, the generated figure of the three-dimensional body is output by a printer or the like.

10 Claims, 9 Drawing Sheets

METHOD OF AND APPARATUS FOR GENERATING ASSEMBLY VIEW

This application is a continuation of application Ser. No. 08/254,891, filed Jun. 6, 1994, now abandoned.

BACKGROUND OF THE INVENTION (1) Field of the Invention

The present invention relates to a method of and an apparatus for generating an assembly view from design drawing data by a CAD (computer-aided design) system, and more specifically, to a method of and an apparatus for generating an assembly view of a three-dimensional body composed of a plurality of parts.

(2) Description of the Related Art

A CAD system has become indispensable in a design job to cope with complicated design specifications as well as to effectively carry out a design and drafting job, shorten a design period and simplify jobs accompanying with design. As industries are sophisticated, the function of the CAD system and the field to which the CAD system is applied are enlarged and the CAD system will be hereinafter more and more required to strongly associate with other departments such as, for example, a manufacturing department in addition to a design department.

A product is specifically represented by means of three kinds of views, i.e., a front view, a side view and a plan view at the step of design and the three kinds of views serve as a base in design job. The three kinds of views are generated using various function of a CAD system such as, for example, a drafting function, or diverting and editing existing drawings stored in a data base and then output as drawings. Although the three kinds of views are two-dimensional design drawings, a figure of an image near to the configurational characteristics of an actual body can be generated by three-dimensionally representing the three kinds of views using a three-dimension converting function.

A product designed by a designer is mainly represented by three kinds of views, the three kinds of views cannot be easily understood by staffs of other departments such as, for example, a product planning department which is not related to a design job and a service department which carries out maintenance of products. As described above, it is difficult to cause persons who are not accustomed to the three kinds of views to intuitively understand the image of a product from the three kinds of views.

To cope with this problem, conventionally, there is provided an assembly view of a designed product which is viewed from an optional direction of the product to permit the product to be intuitively understood, in addition to three kinds of views. Since the generation of the assembly view is usually ordered to a technical illustrator or the like, however, it is very expensive and the preparation of it needs a long period of time. Further, since the assembly view is drawn by the technical illustrator by hand based on three kinds of views, it is not of high precision.

SUMMARY OF THE INVENTION

An object of the present invention is to provide a method of and an apparatus for generating an assembly view from a three-dimensional body composed of a plurality of parts representing a product in a short time at a low cost with a pinpoint accuracy, the assembly view representing the three-dimensional body viewed from an arbitrary direction.

To achieve the above object, there is provided a method of generating an assembly view of a three-dimensional body composed of a plurality of parts by a CAD system, which comprises the steps of recognizably displaying a three-dimensional body composed of a plurality of individually defined parts to a three-dimensional coordinate system set on a two-dimensional plane, entering movement information including a direction of view point used when a generated assembly view is output, an individual instruction of parts to be moved of the plurality of the parts constituting the three-dimensional body and a moving direction and a moving distance of each of the instructed parts, moving at least the parts about which the movement information is entered from the position of the two-dimensional plane where the three-dimensional body is arranged to positions on the two-dimensional plane which are determined by the movement information, projecting the three-dimensional body including the parts having been moved from the direction of view point onto the two-dimensional plane to thereby generate the assembly view of the three-dimensional body viewed from the direction of view point, and outputting the generated assembly view.

Further, according to the present invention, there is provided an apparatus for generating an assembly view of a three-dimensional body composed of a plurality of parts by a CAD system, which comprises information storing means for storing the information of a plurality of individually defined parts and the information of a three-dimensional body composed of the plurality of the parts, display means for displaying the information of the three-dimensional body to a three-dimensional coordinate system set on a two-dimensional plane, movement information entering means for entering movement information including a direction of view point used when a generated assembly view is output, an individual instruction of parts to be moved of the plurality of the parts constituting the three-dimensional body and a moving direction and a moving distance of each of the instructed parts, processing means for carrying out a movement processing for moving the plurality of the parts constituting the three-dimensional body in accordance with the movement information entered from the movement information entering means and a figure generating processing for generating a figure of the three-dimensional body on a two-dimensional plane from the direction of point of view after the completion of the movement processing, and figure output means for outputting the figure of the three-dimensional body including the parts having been moved and generated on the two-dimensional plane.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

First, an embodiment of the present invention will be roughly described.

Figure 1:
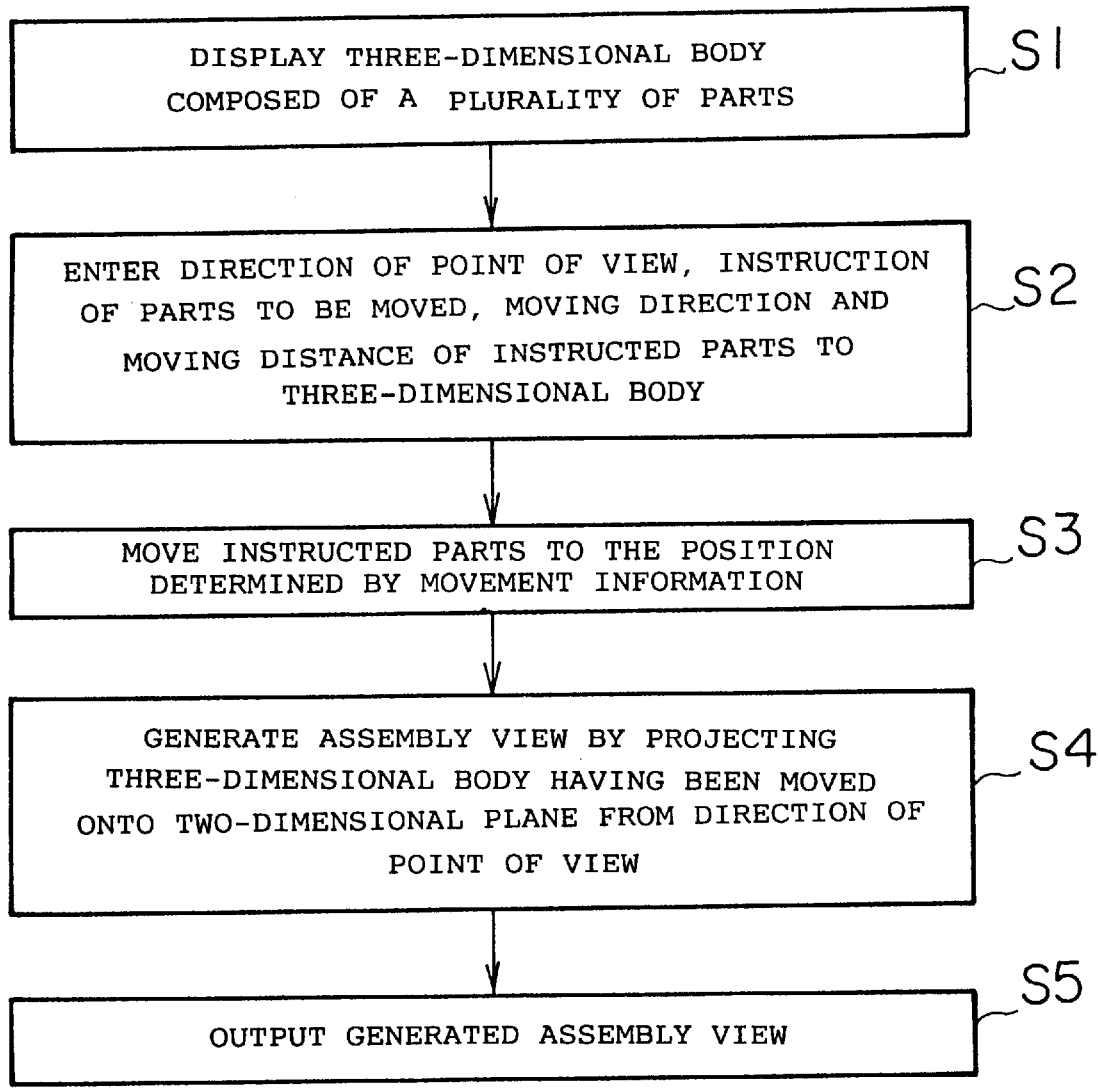
FIG. 1 is a diagram explaining a principle of a method of generating an assembly view according to the present invention.

FIG. 1 is a diagram explaining a principle of a method of generating an assembly view according to the present invention. In FIG. 1, the method of generating an assembly view according to the present invention is arranged such that, first, at step S1 a three-dimensional body composed of a plurality of individually defined parts is displayed to a three-dimensional coordinate system set on the display screen of a two-dimensional plane. At step S2, movement information necessary to generate an assembly view is entered. More specifically, as to the displayed three-dimensional body, a direction of view point from which a product is desired to be viewed as an assembly view is entered by, for example, a degree of axis rotation, parts to desired to be disassembled and moved from the parts constituting the product and directions in which the disassembled parts are to be moved are instructed and moving distances of the disassembled parts are entered. The instruction of the parts, the moving directions and moving distances of them are entered with respect to all the parts desired to be disassembled. At step S3, the three-dimensional body is disassembled by moving all the parts instructed at step S2 in the instructed directions by the entered moving directions, respectively in accordance with the entered movement information. At step S4, an assembly view is generated by projecting the three-dimensional body, which has been disassembled by moving the instructed parts, onto a two-dimensional plane from the direction of point of view entered at step S2. Then, at step S5, the assembly view of the three-dimensional body generated on the two-dimensional plane is output.

Figure 2:
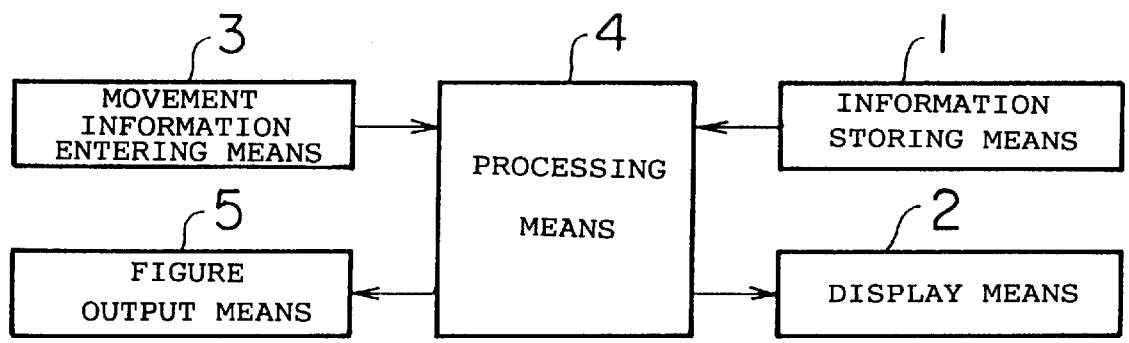
FIG. 2 is a diagram showing an arrangement of an apparatus for generating an assembly view according to the present invention.

FIG. 2 is a diagram showing a principle of an apparatus for generating an assembly view according to the present invention. In FIG. 2, the apparatus for generating an assembly view according to the present invention comprises information storing means 1 for storing the information of a plurality of individually defined parts and the information of a three-dimensional body composed of the plurality of these parts, display means 2 for displaying the information of the three-dimensional body to a three-dimensional coordinate system set on the display screen of a two-dimensional plane, movement information entering means 3 for entering movement information necessary to generate an assembly view, that is, movement information including a direction of point of view used when at least a generated assembly view is output, the instruction of individual parts to be moved of the plurality of the parts constituting the three-dimensional body displayed on the display means 2 and a moving direction and a moving distance of each of the instructed parts, processing means 4 for executing a movement processing of the plurality of the parts constituting the three-dimensional body in accordance with the movement information entered from the movement information entering means 3 and a figure generation processing for generating a figure of the three-dimensional body on the two-dimensional plane from the direction of point of view to be carried out after the completion of the movement processing, and figure output means 5 for outputting a figure of the three-dimensional body which is generated on the two-dimensional plane and includes the parts having been moved.

According to the apparatus for generating the assembly view of FIG. 2, the information storing means 1 stores the information of the plurality of the parts which are individually defined and the information of the three-dimensional body composed of the plurality of the parts. The information of the three-dimensional body is information of three kinds of views representing a product obtained from drawing data base and the like or newly made by the drafting function of a CAD system.

The display means 2 displays the information of the three-dimensional body stored in the information storing means 1 to the three-dimensional coordinate system set on the display screen of the two-dimensional plane so that the plurality of the parts are recognizably displayed. It is preferable that the three-dimensional body is displayed as a perspective view viewed from a display direction which is preset using the rotary function of a CAD system.

The movement information entering means 3 for entering various movement information necessary to generate an assembly view enters a direction of point of view from which an assembly view to be generated is viewed, an instruction of individual parts to be moved, and a direction and a distance in which and by which each of the instructed parts is to be moved, respectively.

The processing means 4 moves all the parts to be moved in accordance with the movement information entered from the movement information entering means 3 and, following to the movement processing, generates a figure of the three-dimensional body whose parts are disassembled by projecting the three-dimensional body composed of the plurality of the parts from the direction of point of view onto the two-dimensional plane. Then, the figure output means 5 outputs the figure of the three-dimensional body generated on the two-dimensional plane by the processing means 4 to a printer or the like.

Next, the embodiment of the present invention will be described below in detail.

Figure 3:
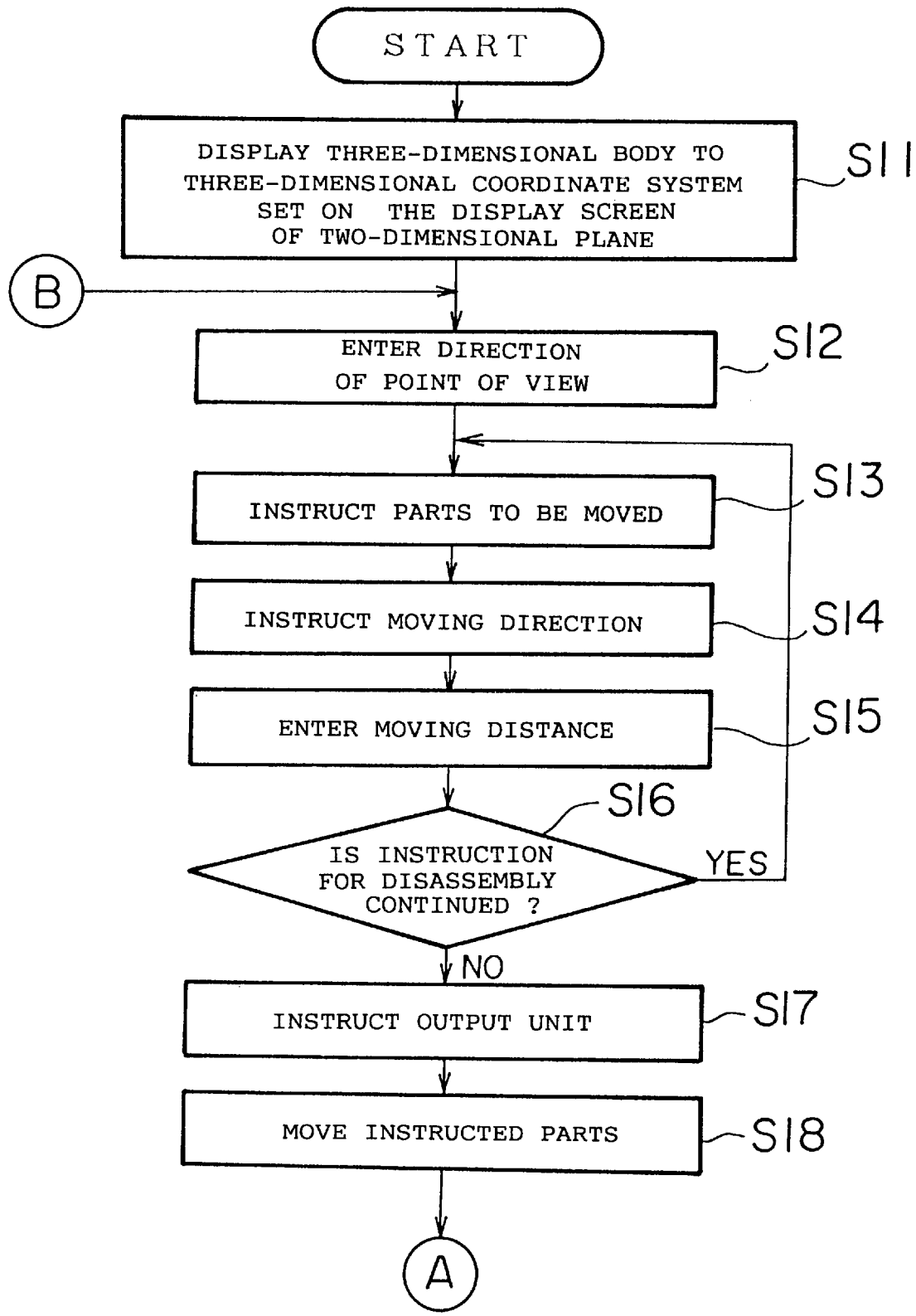
FIG. 3 is a flowchart (No.1) of a processing sequence according to the present invention.
Figure 4:
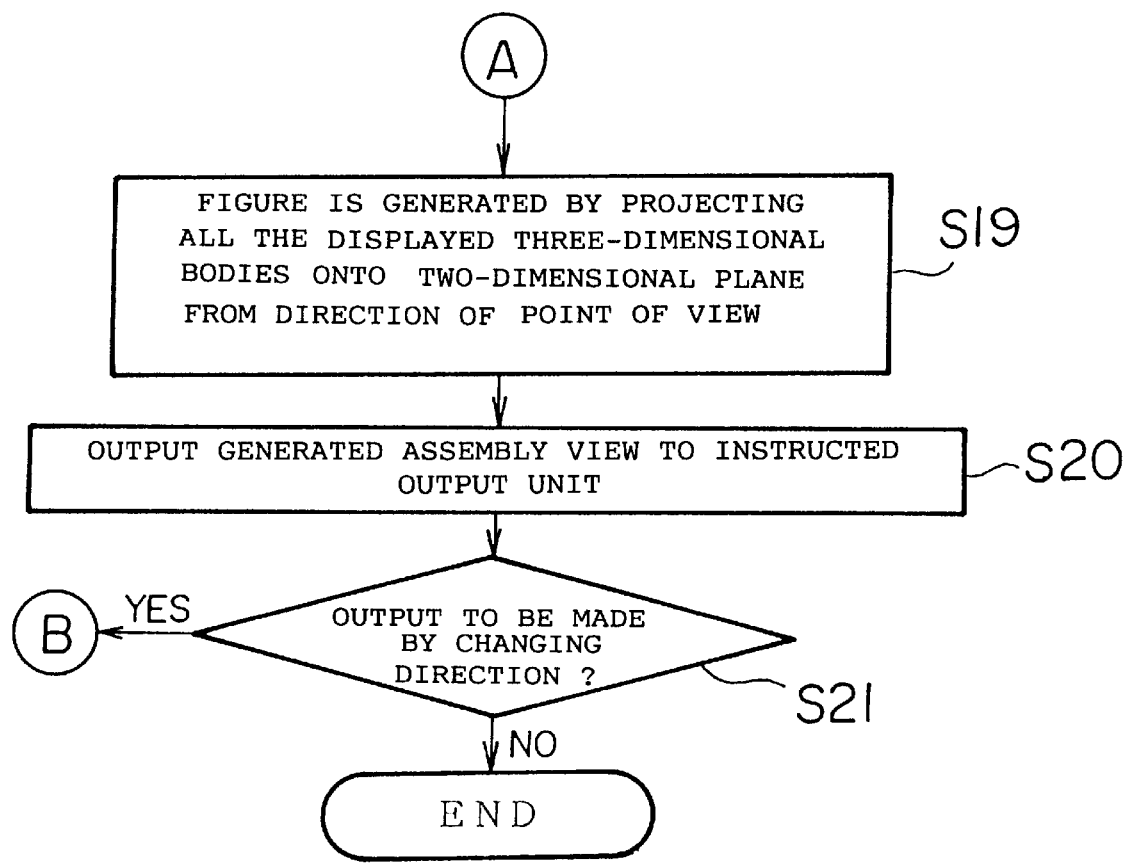
FIG. 4 is a flowchart (No.2) of a processing sequence according to the present invention.
Figure 5A:
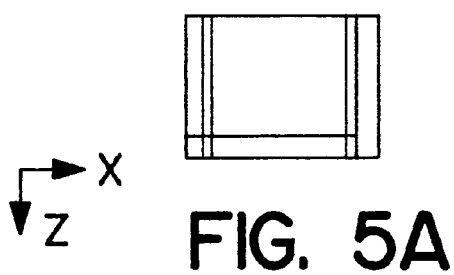
FIG. 5 is a view showing an image of a three-dimensional body displayed on a display screen by way of example.
Figure 5B:
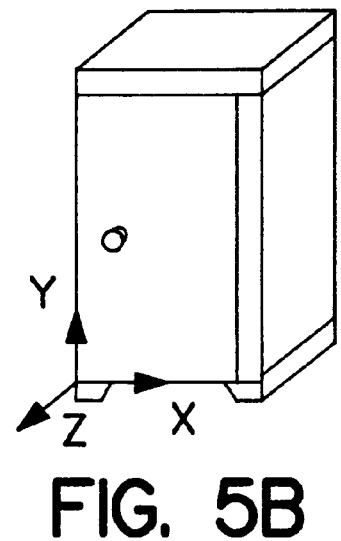
Figure 5C:
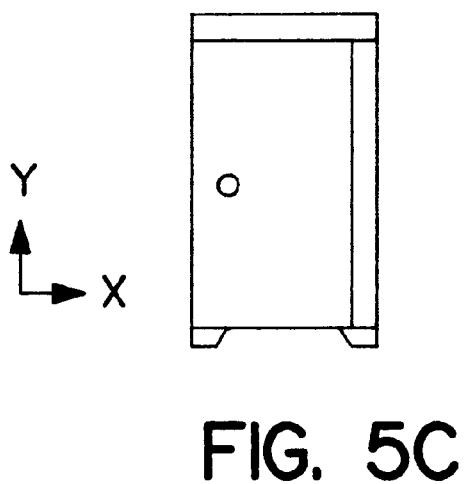
Figure 5D:
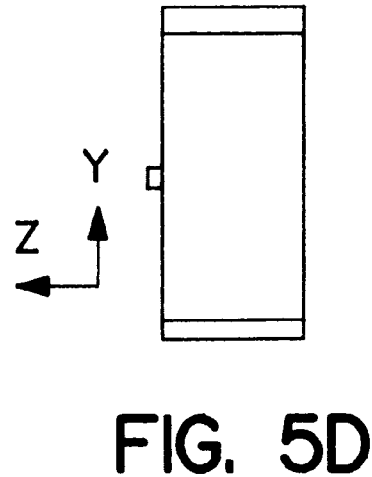

FIG. 3 is a flowchart (No.1) of a processing sequence representing the assembly view generating method according to the present invention and FIG. 4 is a flowchart (No.2) of a processing sequence according to the present invention. Usually, a designed product is made and kept in the form of three kinds of views. The three kinds of views are newly made using or diverting existing three kinds of views stored in an external storing unit such as a database, a magnetic tape and the like or using the drafting function of a CAD system. The thus designed product is usually composed of a plurality of parts and each of the parts has an individually defined shape and size. First, a three-dimensional body composed of the plurality of the parts is recognizably displayed to a three-dimensional coordinate system set on the two-dimensional plane of a display screen (step S11). More specifically, the three-dimensional body is three-dimensionally displayed in the form of a perspective view viewed from a predetermined display direction.

FIG. 5 is a view showing an image of a three-dimensional body by way of example which is displayed by being viewed from a preset display direction by rotating the three-dimensional body. According to FIG. 5, the display screen is divided into four regions and, for example, an X-Z coordinate plane is displayed in its upper left region, an X-Y coordinate plane is displayed in its lower left region, and a Z-Y coordinate plane is displayed in its lower right region. At the upper right of the display screen, a three-dimensionally recognizable rectilinear coordinates of X-, Y- and Z- axes are displayed. A three-dimensional product shown in FIG. 5 is, for example, a unit type warehouse.

Returning to FIG. 3, the flowchart for generating an assembly view will be continuously described.

Next, a direction of point of view from which an assembly view of the three-dimensional body shown in FIG. 5 is to be viewed is entered (step S12). This is carried out by, for example, entering a value of a degree of axis rotation to a screen display image prompting the enter of a direction of point of view through a keyboard. For example, when the values X=0.0, Y=20.0 and Z=−30.0 are entered, the assembly view of the product is instructed to be generated by viewing the product from the position of point of view at 30° on the left of the product and at 20° upwardly of the product. At this time, the display screen is preferably changed to display a figure viewed from the instructed direction in response to an instruction entered or automatically changed to display the figure.

Next, parts desired to be disassembled and moved of the plurality of the parts constituting the product are instructed (step S13). This instruction is executed to the figure three-dimensionally displayed on the display screen. At this time, the display screen may be changed to, for example, a divided screen such as shown in FIG. 5 or only a display screen switched such as the one shown in the upper right region of FIG. 5.

Next, a moving direction of the parts instructed to be moved at step S13 is instructed (step S14) and a value of a desired distance by which each of the parts is to be moved is entered (step S15). On the completion of a series of the steps S13–S15, it is determined whether an instruction for disassembling other parts is needed or not (step S16), and when it is needed, the series of the steps S13–S15 are repeated.

Figure 6A:
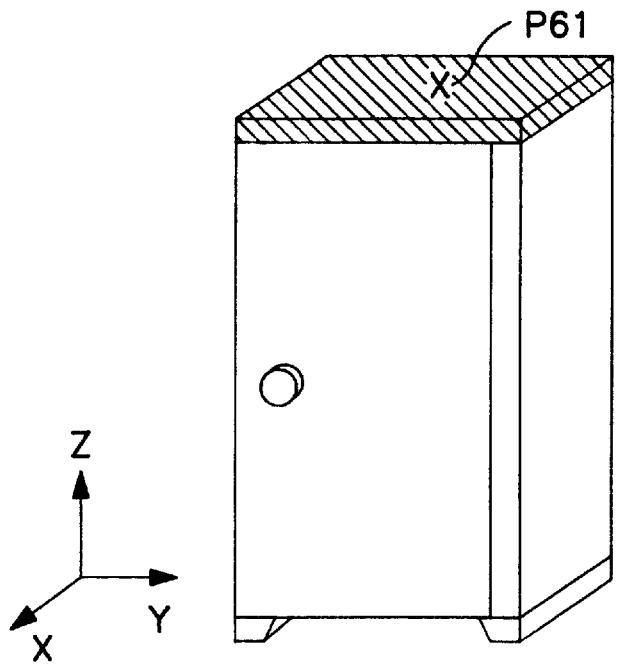
FIG. 6(A) is a view showing an operation for instructing a part to be moved to a figure shown on a display screen by way of example.
Figure 6B:
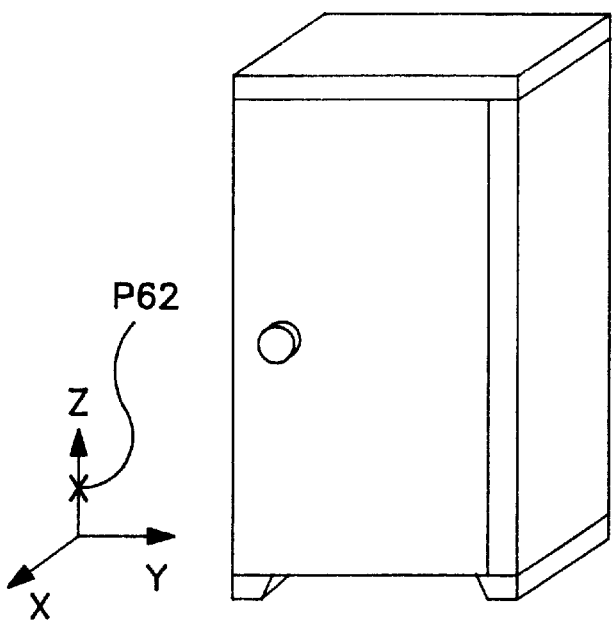
FIG. 6(B) is a view showing an operation for instructing a moving direction to a figure shown on a display screen by way of example.

FIG. 6(A) and FIG. 6(B) are views showing an entering operation for instructing a part desired to be disassembled and moved to a figure displayed on a display screen and a moving direction and a moving distance of the part, that is, an example of the operation of the series of the steps S13–S15 to be carried out. A figure which three-dimensionally represents a product and rectilinear coordinates are shown on the display screen of each of FIGS. 6(A) and 6(B). The displayed figure is used to instruct a part to be moved by, for example, a mouse and the rectilinear coordinates are used to instruct a direction in which the part is desired to be disassembled and moved by a pointing device such as, for example, the mouse.

FIG. 6(A) depicts that a point P61 on a part to be moved in the figure by, for example, the cursor of the mouse (shown by "X" in FIG. 6(A) is picked up) and that the part existing at the position selected as a part to be moved. When instructed by the mouse, for example, the color of the instructed part (ceiling member of a unit warehouse in the illustrated example) is preferably changed or inverted to show the part is instructed. FIG. 6(B) depicts that a point P62 on a coordinate axis by the mouse is pointed out and that a Z-axis direction is instructed as a moving direction of the part instructed by the point P61. Although not shown, a value of a distance by which the part is desired to be moved is entered through, for example, a keyboard thereafter. These operations are carried out to all the parts desired to be disassembled and moved.

Returning again to FIG. 3, an output unit for outputting the generated assembly view is instructed (step S17). More specifically, whether the generated assembly view is to be output by a printer, a plotter or a hard color copy machine is instructed by selecting, for example, a corresponding menu displayed on a display screen. Unless a hard copy of the assembly view is needed, the generated assembly view is only displayed on the display screen by not selecting any of the output units, by which a processes while the assembly view is being made can be confirmed.

Next, all the parts instructed at step S13 are disassembled and moved in the directions instructed at step S14 by the distances entered at step S15, respectively (step S18). The disassembly and movement are carried out by moving in parallel the local coordinate system of the solid data of each of the parts to be moved.

Figure 7:
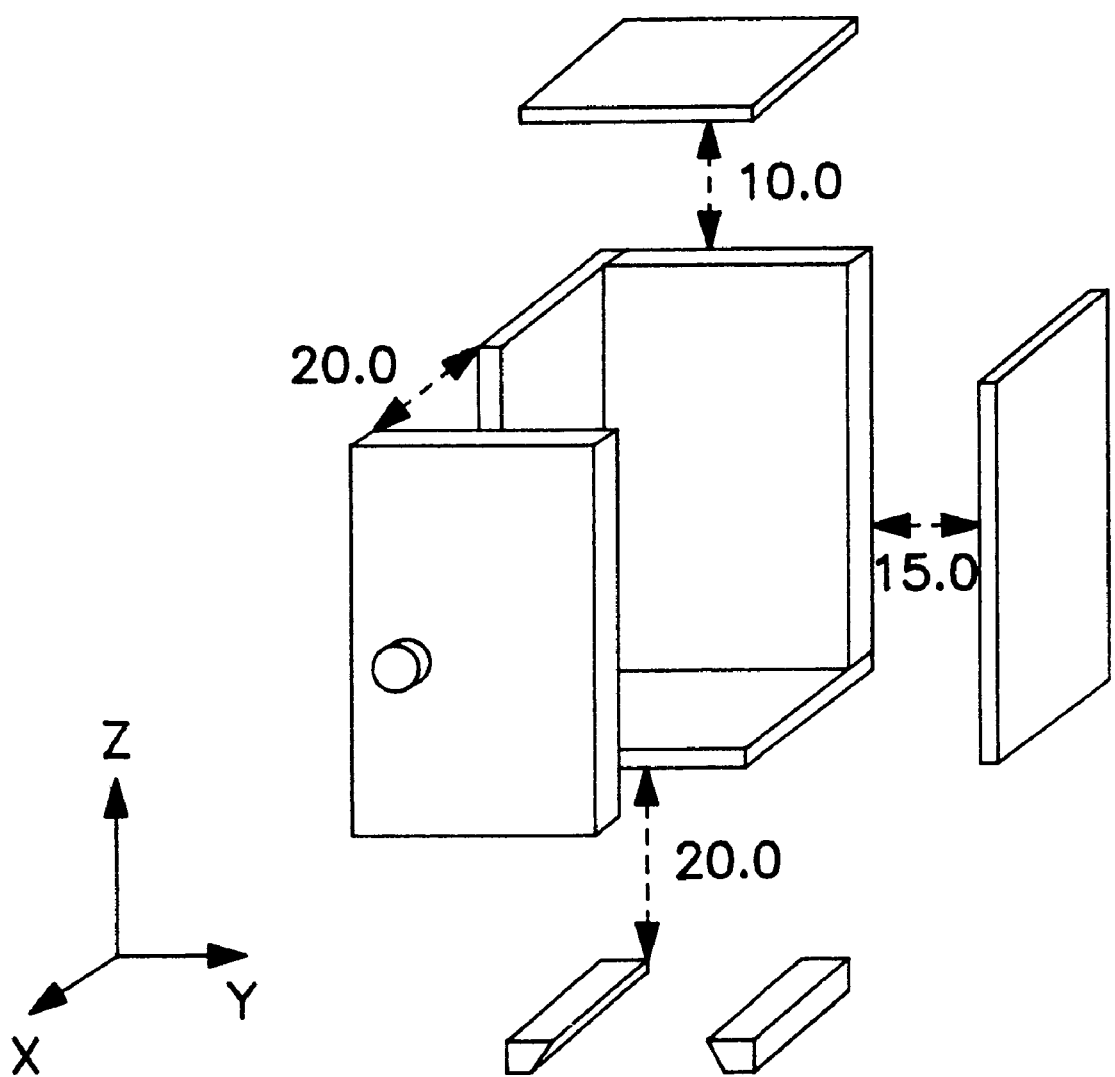
FIG. 7 is a view showing an image of a disassembled and moved figure displayed on a display screen by way of example.

FIG. 7 is a view showing a display screen image of a disassembled and moved figure by way of example. According to FIG. 7, a door of the unit warehouse is moved in an X-axis direction by 20.0 cm, a wall plate on the right side of the unit warehouse is moved in a Y-axis direction by 15.0 cm, the ceiling plate is moved in a Z-axis direction by 10.0 cm and a base is moved in the direction opposite to the Z-axis by 20.0 cm.

Returning to FIG. 4, a figure of all the three-dimensional bodies including the disassembled and moved parts is generated by projecting these three-dimensional bodies onto a two-dimensional plane from the direction of point of view entered at step S12 (step S19). At this time, the invisible lines and invisible surfaces of the three-dimensional body, that is, the hidden lines and hidden surfaces thereof are simultaneously deleted.

A parallel projection or a perspective projection may be used as a method of projecting the three-dimensional body onto the two-dimensional plane.

Next, the figure of the assembly view generated by projecting the three-dimensional body onto the two-dimensional plane is output by the output unit instructed at step 17. That is, when a printer is instructed as the output unit, the generated figure is output by the printer.

Finally, whether an assembly view viewed from a different direction is needed or not is determined (step S21). When the direction of point of view is desired to be changed, the process returns to step S12 and the processing sequence is repeated from the entering of a direction of point of view. At this time, all the movement information with respect to the movement of the three-dimensional body having been disassembled is retained and displayed as initial values to display screens which prompts to enter data at steps S13–S15 and it suffices to update only data to be changed.

Figure 8:
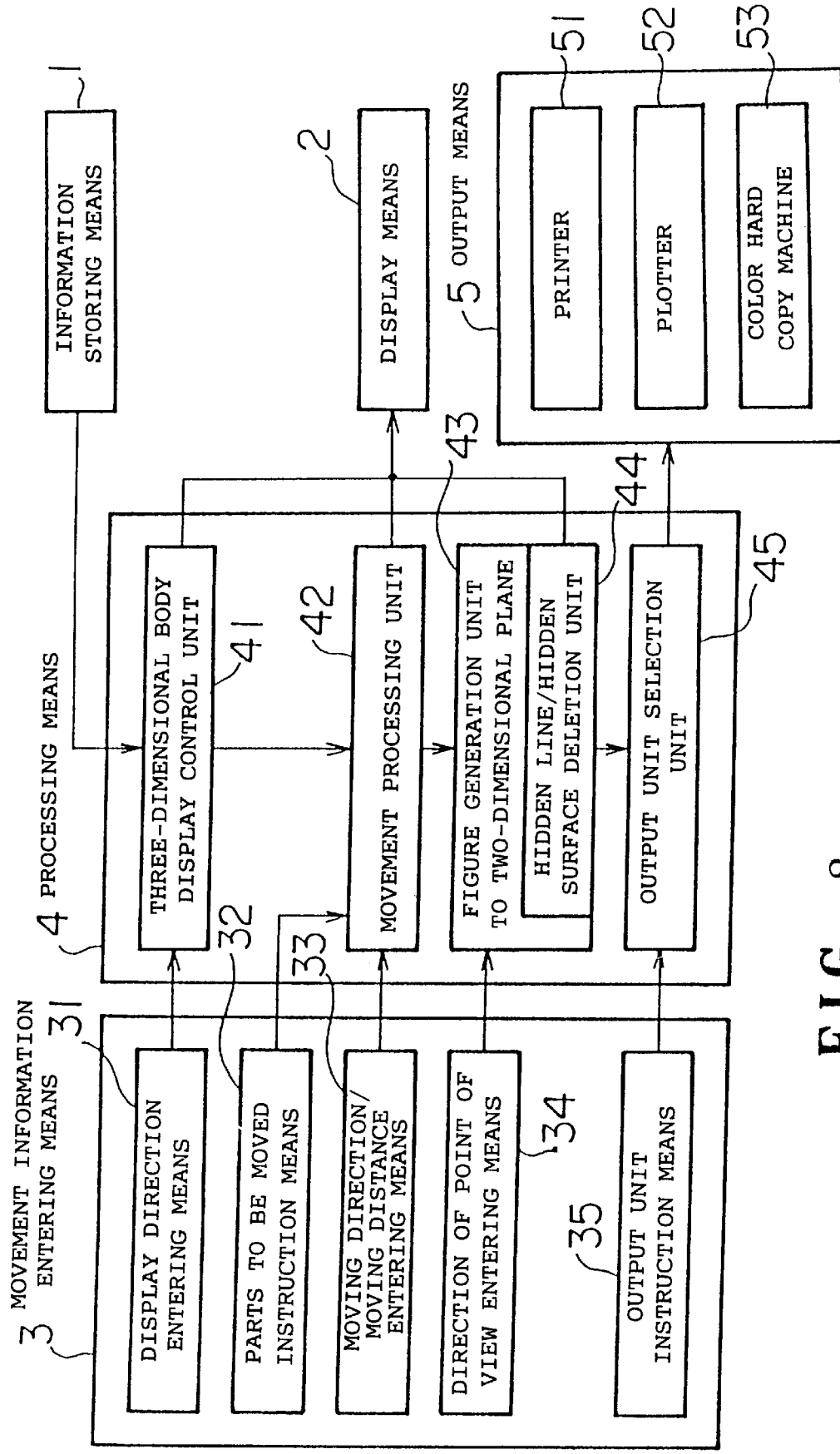
FIG. 8 is a diagram showing an arrangement of an embodiment of an apparatus for generating an assembly view according to the present invention.

FIG. 8 is a diagram showing an arrangement of an embodiment of an apparatus for generating an assembly view according to the present invention. In FIG. 8, numeral 1 designates information storing means for storing the information of design drawings of a product composed of a three-dimensional body generated by a CAD system. Numeral 2 designates display means which is used to display a designed three-dimensional body, an assembly view showing disassembled parts and selection menus used when movement information is to be entered.

Numeral 3 designates movement information entering means which comprises a display direction entering means 31 for entering a display direction when a three-dimensional body is to be solidly displayed on the display means 2, parts to be moved instruction means 32 for selectively instructing parts to be disassembled and moved, moving direction/moving distance entering means 33 for entering moving directions and moving distances of the parts instructed to be moved, direction of point of view entering means 34 for entering a direction when an assembly view is output, and output unit instruction means 35 for instructing an output unit by which the assembly view is output. The display direction entering means 31 can enter a display direction at any time so that a display direction can be changed at all times. Further, the display direction is preferably set to the same direction as a direction of point of view entered by the direction of point of view entering means 34 so that a part instructed to be moved has the same image as that shown in an output view.

A processing means 4 receives the information and the movement information of the three-dimensional body from the information storing means 1 and the display direction entering means 31 and includes a three-dimensional body display control unit 41 to cause the display means 2 to display the three-dimensional body to a three-dimensional coordinate system set on a two-dimensional plane. The processing means 4 further includes a movement processing unit 42 for receiving the movement information from the parts to be moved instruction means 32 and the moving direction/moving distance entering means 33, carrying out the movement processing of all the parts to be moved and supplying a result of the movement to the display means 2, and a figure generation unit 43 to two-dimensional plane for generating a figure of the three-dimensional body having been subjected to the movement processing based on the movement information received from the direction of point of view entering means 34 on a virtual two-dimensional plane and causing the display means 2 to display the figure. The figure generation unit 43 to two-dimensional plane includes a hidden line/hidden surface deletion processing unit 44 for deleting hidden lines and hidden surfaces when the figure is generated on the two-dimensional plane. The processing means 4 further includes an output unit selection unit 45 for supplying the figure information of the three-dimensional body generated on the two-dimensional plane based on the movement information received from the output unit instruction means 35 to a selectively instructed output unit.

The figure output means 5 draws a figure of a three-dimensional body generated by the figure generation unit 43 to two-dimensional plane to the surface of a specific display medium and comprises an output unit such as, for example, a printer 51, a plotter 52, a color hard copy machine 53 or the like.

Figure 9:
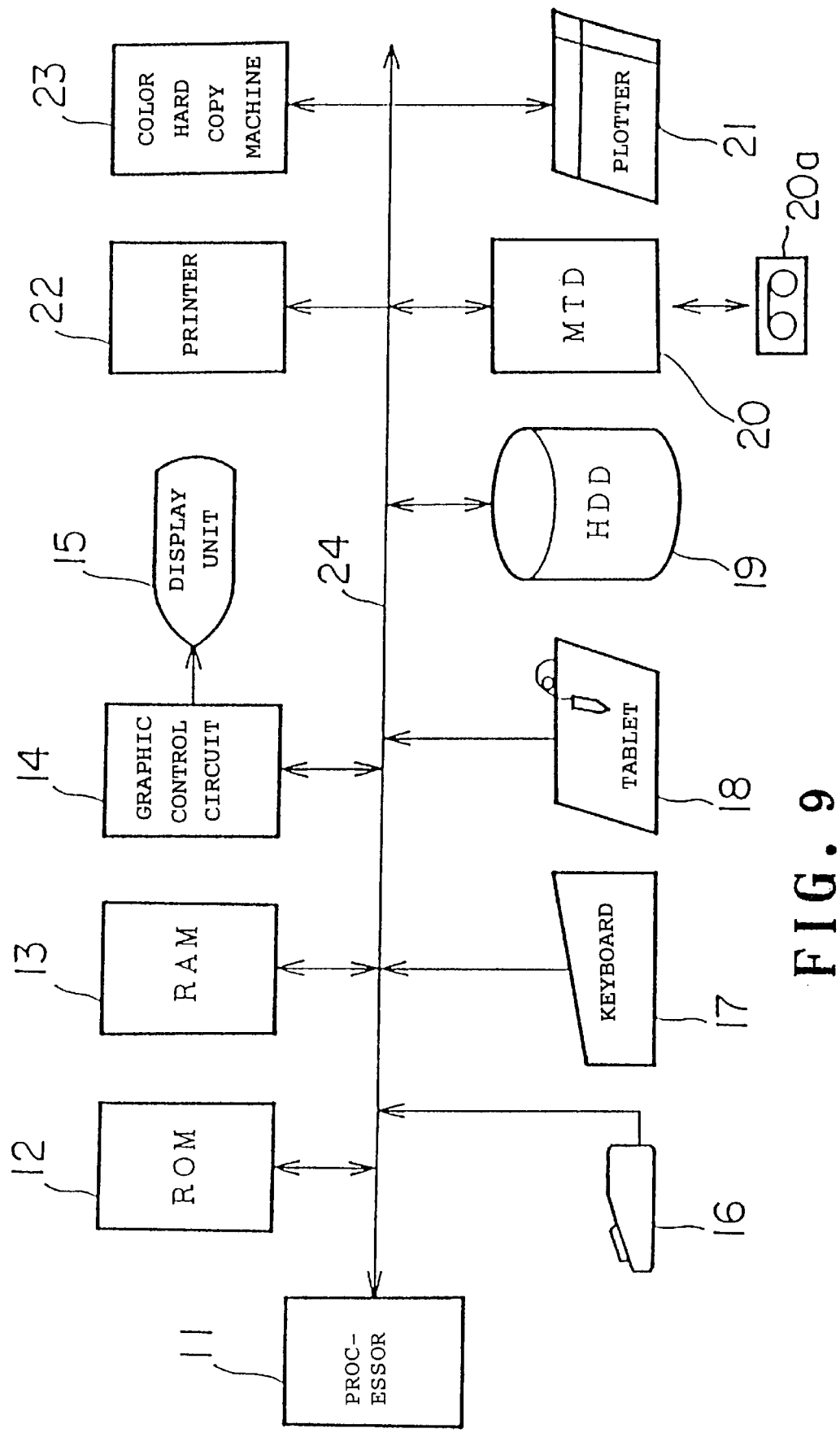
FIG. 9 is a diagram showing a hardware arrangement of an apparatus for generating an assembly view embodying the present invention by way of example.

FIG. 9 is a diagram showing a hardware arrangement of an apparatus for generating an assembly view embodying the present invention by way of example. In FIG. 9, a processor 11 controls an apparatus for generating the assembly view in its entirety according to a system program stored in a ROM 12. A main memory 13 stores the data of a three-dimensional body whose assembly view is to be generated, the data of the three-dimensional body having been generated onto a two-dimensional plane and the like in addition to an application program of a CAD system including a program for generating an assembly view loaded thereto.

A graphic control circuit 14 converts two-dimensional line segment data generated in the main memory 13 into a display signal, converts three-dimensional data generated therein into two-dimensional data and then converts the resulting data into a display signal, and converts data obtained by deleting a hidden line into a display signal and supplies these display signals to a display unit 15. The display unit 15 displays three kinds of views, a figure of a three-dimensional body and the like based on the received display signals.

A mouse 16 is used to instruct the selection of a figure, a direction in which a part is to be disassembled and moved, various menus and the like each displayed on the display screen of a display unit 15 by moving a cursor displayed on the display screen 15 and clicking a button. A keyboard 17 is used to enter various data such as a value of a degree of axis rotation by which a desired direction from which a figure is viewed is represented, a value of a distance by which a disassembled part is desired to be moved and the like. A tablet 18 is used to enter coordinates when three kinds of views are to be generated.

A hard disk unit 19 stores application programs, various data necessary to drafting and the like and also is used as drawing data base. A magnetic tape unit 20 is an external storing unit which can enter the data of design drawings by driving a magnetic tape 20a or store the data of generated design drawings, assembly views and the like to the magnetic tape 20a.

Further, the data of a generated assembly view in an arbitrary direction can be output to a plotter 21, a printer 22 or a color hard copy machine 23 in addition to the display unit 15. These components are interconnected through an interface circuit (not shown) and a bus 24.

As described above, according to the present invention, an assembly view is generated in such a manner that a three-dimensional body composed of a plurality of individually defined parts is recognizably displayed, movement information as to the three-dimensional body is entered which includes a direction in which the product is viewed, parts desired to be disassembled and moved from the three-dimensional body, and moving directions and moving distances of the parts to be dissembled and moved, the three-dimensional body is subjected to a movement processing in accordance with the movement information, a figure of the three-dimensional body having been subjected to the movement processing is generated on a two-dimensional plane and the thus generated assembly view is output. Consequently, an assembly view can be generated without wasting a long time only for it, requiring a cost and depending upon a hand work of a bad accuracy.

Further, since not only an assembly view viewed from one direction but also assembly views viewed from various directions can be generated in a short time, a job for generating assembly views can be effectively carried out.

The forgoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of generating a disassembled view of a three-dimensional body in a CAD system, the three-dimensional body composed of a plurality of parts, said method comprising the steps of:

a) displaying the three-dimensional body as a whole to a three-dimensional coordinate system mapped on a display screen of the CAD system;

b) selecting at least two parts from the plurality of parts constituting the three-dimensional body from the displayed three-dimensional body as a whole;

c) entering movement information for the parts selected in step b), the movement information comprising a direction of a point of view to be used when the disassembled view is generated and, for each of the selected parts, a moving distance by which the selected part is to be moved relative to the three-dimensional body as a whole and a moving direction in which the selected part is to be moved;

d) moving all of the selected parts from the positions where the three-dimensional body as a whole is arranged to new positions determined by the movement information whereby the selected parts are exploded away to new positions;

e) projecting the three-dimensional body showing the selected parts in the new positions apart from the three-dimensional body as a whole to generate the disassembled view of the three-dimensional body as viewed from the direction of the point of view; and f) outputting the generated disassembled view to the display screen of the CAD system.

2. A method of generating a disassembled view according to claim 1, wherein said three-dimensional body is displayed at a position in the coordinate system which is rotated about at least a coordinate axis.

3. method of generating a disassembled view according to claim 1, wherein said step c) includes a substep of deleting hidden lines and hidden surfaces.

4. An apparatus for generating a disassembled view of a three-dimensional body in a CAD system, wherein the three-dimensional body is composed of a plurality of parts individually defined as three-dimensional objects, the apparatus comprising:

information storing means for storing information about the plurality of parts and information about the three-dimensional body composed of the plurality of parts;

display means for displaying the three-dimensional body as a whole to a three-dimensional coordinate system mapped on a display screen of the CAD system;

movement information entering means for entering movement information by selecting at least two parts from the plurality of parts constituting the three-dimensional body while the three-dimensional body is displayed as a whole, the movement information comprising a direction of a point of view to be used when the disassembled view is generated and, for each of the selected parts, a moving distance by which the selected part is to be moved relative to the three-dimensional body as a whole and a moving direction in which the selected part is to be moved;

processing means for carrying out a movement processing for moving all of the selected parts apart from the three-dimensional body as a whole in accordance with the movement information entered from said movement information entering means, and for generating the disassembled view of the three-dimensional body as viewed from said direction of the point of view after the completion of said movement processing; and figure output means for outputting, to the display screen of the CAD system, the disassembled view of the three-dimensional body showing the selected parts having been moved.

5. An apparatus for generating a disassembled view according to claim 4, wherein said movement information entering means includes a display direction entering means for entering information for causing the three-dimensional body to be displayed at a position to which the three-dimensional body is rotated about at least a coordinate axis in said coordinate system.

6. An apparatus for generating a disassembled view according to claim 4, wherein said processing means includes a hidden line/hidden surface deletion processing unit for deleting hidden lines and hidden surfaces when the figure of the three-dimensional body is generated after the completion of said movement processing.

7. A method of generating a disassembled view of a three-dimensional body having a plurality of parts, the method comprising:

(a) displaying the three-dimensional body in an assembled state on a display screen;

(b) selecting at least one part, used to generate the disassembled view, by indicating the at least one part on the three-dimensional body as displayed in the assembled state;

(c) inputting a moving direction for each of the parts selected at step (b);

(d) inputting a moving distance for each of the parts selected at step (b); and (e) displaying a disassembled view of the three-dimensional body with each of the parts selected at step (b) disassembled and moved in the direction inputted at step (c) by the distance inputted at step (d).

8. A method of generating a disassembled view of a three-dimensional body according to claim 7, wherein:

the step (c) includes a step of inputting a direction of point of view for the disassembled view; and the step (e) includes a step of displaying the disassembled view from the direction of point of view.

9. An apparatus for interactively generating a disassembled view of a three-dimensional body having a plurality of parts, the apparatus comprising:

(a) display means for displaying the three-dimensional body in an assembled state;

(b) selection means for selecting at least one part from the displayed three-dimensional body in the assembled state;

(c) input means for inputting a moving direction for each of the parts selected by said selection means (b);

(d) second input means for inputting a moving distance for each of the parts selected by said selection means (b); and (e) second display means for displaying a disassembled view of the three dimensional body with each of the parts selected by said selection means (b) disassembled and moved in the direction inputted by said input means (c) by the distance inputted by said second input means (d).

10. An apparatus for interactively generating a disassembled view of the three-dimensional body according to claim 9, wherein:

said input means (c) inputs a direction of point of view; and said second display means (e) displays the disassembled view from the direction of point of view.

* * * * *